United States Patent [19]

Berardo et al.

[11] Patent Number: 4,738,874
[45] Date of Patent: Apr. 19, 1988

[54] PROCESS FOR THE PRODUCTION OF POROUS, PERMEABLE MINERAL MEMBRANES

[75] Inventors: Michel Berardo, Roquenaure; Jean Charpin, Paris; Jean-Marie Martinet, Montelimar, all of France

[73] Assignee: Commissariat a l'Energie Atomique, Paris, France

[21] Appl. No.: 813,615

[22] Filed: Dec. 26, 1985

[30] Foreign Application Priority Data

Dec. 28, 1984 [FR] France ................. 84 20012

[51] Int. Cl.$^4$ ............................................. B05D 5/00
[52] U.S. Cl. ................................... 427/244; 427/246; 427/247; 427/309; 427/344
[58] Field of Search .............. 427/246, 247, 244, 333, 427/309, 341; 252/313.1, 314; 210/500.25

[56] References Cited

U.S. PATENT DOCUMENTS

| | | | |
|---|---|---|---|
| 3,259,585 | 7/1966 | Fitch et al. | 252/313.1 |
| 3,282,857 | 11/1966 | Fitch et al. | 252/313.1 |
| 3,312,630 | 4/1967 | Vanik et al. | 252/313.1 X |
| 3,767,453 | 10/1973 | Hoekstra | 252/313.1 X |
| 3,773,549 | 11/1973 | Elbert et al. | 427/247 X |
| 3,926,799 | 12/1975 | Thomas et al. | 210/653 |

FOREIGN PATENT DOCUMENTS

| | | |
|---|---|---|
| 0040282 | 11/1981 | European Pat. Off. . |
| 865695 | 5/1941 | France . |
| 2463636 | 2/1981 | France . |
| 2527092 | 11/1983 | France . |
| 56944 | 3/1970 | Luxembourg . |
| 604826 | 9/1978 | Switzerland . |

*Primary Examiner*—Evan K. Lawrence
*Attorney, Agent, or Firm*—Oblon, Fisher, Spivak, McClelland & Maier

[57] ABSTRACT

The invention relates to a process for the production of porous, permeable, mineral membranes.

According to this process, on a porous, permeable substrate is formed a thin layer of at least one mineral compound chosen from among the simple or mixed metal oxides, except aluminum oxide and mixed aluminium oxides, simple or mixed metal hydroxides, except aluminium hydroxide and mixed aluminium hydroxides and mixtures thereof on the basis of a suspension in a liquid of colloidal or non-colloidal particles, said compound or a precursor thereof having particle sizes below 10 μm. The suspension is kept in the finely divided state by the continuous application of energy to the reaction medium. The thus obtained membrane is dried and then annealed at a temperature between 400° and 1100° C.

The use of a suspension of ultrafine colloidal or non-colloidal particles makes it possible to obviate the compression stage and obtain microporous layers with very small pore radii.

19 Claims, No Drawings

PROCESS FOR THE PRODUCTION OF POROUS, PERMEABLE MINERAL MEMBRANES

BACKGROUND OF THE INVENTION

The present invention relates to a process for the production of microporous, permeable, mineral membranes or diaphragms supported by a porous substrate.

More specifically it relates to the production of microporous, permeable, mineral diaphragms or membranes having very small means pore radii, e.g. below 50 Å, which can be used for the separation by ultrafiltration of petroleum derivatives e.g. for the regeneration of used or spent oils.

One of the conventional processes for producing microporous membranes consists of depositing on a porous, permeable substrate from a suspension in a liquid of grains or agglomerates of powder grains, one or more active layers, followed by the drying of the deposited layer or layers, the compression thereof and the fritting of the thus obtained assembly, in the manner described in French Pat. No. 2 527 092 filed by the Commissariat a l'Energie Atomique.

According to this prior art process, the compression operation is indispensable thus, said compression is necessary for bringing about a reorganization of the layer or layers deposited on the substrate, so as to obtain a homogeneous, microporous texture and for obtaining a good mechanical strength by increasing the cohesion within the layer or layers and possibly there adhesion to the substrate. Moreover, with this prior art process, it is necessary to start with a suspension of powders in a liquid, so that it is difficult to obtain membranes with pores of very small sizes.

SUMMARY OF THE INVENTION

The process according to the invention makes it possible to obtain microporous, permeable, mineral membranes with pores of very small sizes, supported by a porous substrate in a simpler manner than was previously possible, particularly in view of the fact that there is no longer any need for a compression stage. Moreover, this process permits the deposition of a microporous layer within a small diameter macroporous tube.

According to the process for the production of a porous, permeable, mineral diaphragm according to the invention, on a porous, permeable substrate is formed a thin layer of at least one mineral compound chosen from among the simple or mixed metal oxides, except aluminium oxide and mixed aluminium oxides, simple or mixed metal hydroxides, except aluminium hydroxide and mixed aluminium hydroxides, as well as mixtures thereof, from a suspension in a liquid of colloidal or non-colloidal particles of said compound or a precursor thereof having grain sizes below 10 $\mu$m, said suspension being obtained by precipitation from a solution of alkoxide or metal salt. The suspension is kept in the finely divided state by the continuous application of energy to the reaction medium. The thus obtained membrane is dried and then annealed at a temperature between 400° and 1100° C.

DETAILED DESCRIPTION OF THE PREFERRED DRAWINGS

According to a variant, on the porous, permeable substrate is formed a thin layer of said mineral compound in which is dispersed a filler or charge and in this case use is made of a suspension which also contains a filler or charge. The added filler makes it possible to give special properties to the membrane. For example, it is possible to use a carbon charge in order to give the membrane electrical conductivity properties, provided that annealing takes place in a non-oxidizing temperature, so as not to deteriorate the carbon particles.

The metal hydroxides and oxides used in the invention can be of widely differing types. They can in particular be in the form of simple or single hydroxides and oxides or in the form of mixed hydroxides and oxides. Examples are simple or mixed hydroxides and oxides of metals chosen from among titanium, zirconium, silicon, magnesium, calcium, colbalt, manganese and nickel.

In certain cases, it is possible to add to one of these oxides or hydroxides, another oxide or hydroxide in a smaller proportion in order to improve certain properties of the membrane. Thus, it is possible to use at least one first mineral compound selected from the group consisting of titanium oxide, zirconium oxide and silicon oxide and at least one second mineral compound selected from the group consisting of yttrium oxide, oxides of lanthanides, vanadium oxide, calcium oxide and magnesium oxide.

When the first mineral compound is zirconium oxide, the second mineral compound advantageously acts as a stabilizer in order to eliminate in the case of zirconia the prejudicial effects of passing from the monoclinic form into the quadratic form, because this is accompanied by a significant volume variation.

For the performance of the process according to the invention, it is possible to prepare the suspension of colloidal or non-colloidal particles of the mineral compound or compounds by different methods. When using a suspension of colloidal particles with grain sizes below 10 $\mu$m and preferably an average grain size equal to or below 0.2 $\mu$m, it is possible to prepare said suspension by precipitating the mineral compound, followed by a peptization treatment of the precipitate in order to transform it into finer colloidal particles.

When the mineral compound is an oxide or hydroxide, the precipitation reaction can be obtained by the hydrolysis of an organic solution of one or more metal alkoxides or by the neutralization of an acid solution of one or more metal salts.

Following this operation, the precipitate obtained by peptization is divided into smaller particles by means of a strong acid, such as perchloric or hydrochloric acid. In order to carry out this peptization reaction, the temperature, acid concentration and reaction time are chosen so as to convert all the precipitate into colloidal particles of appropriate dimensions. This makes it possible to obtain highly divided particles with e.g. grain sizes of approximately 250 to 1000 Å, which is favourable for obtaining a very thin film or layer which, after annealing, has very small mean pore radii.

When using a suspension of colloidal particles, it is also possible to prepare this suspension by precipitating the mineral compound and applying energy to the reaction medium.

The precipitation reaction can be performed as described hereinbefore by the hydrolysis of an organic solution of one or more metallic alkoxides or by the neutralization of an acid solution of one or more metal salts.

After or during this operation, the precipitate obtained by applying energy to the reaction medium can be divided into finer particles. The energy used can be a mechanical energy, e.g. ultrasonic energy, or electrical energy, e.g. an electrical field, or can can consist of an irradiation.

When using the latter procedure for preparing the suspension of colloidal particles, it is preferable to use the suspension very rapidly, because its stability during storage is not as good as in the previous case, where the precipitate obtained undergoes peptization by means of a strong acid such as perchloric acid or hydrochloric acid.

When using a suspension of non-colloidal particles, it is possible to prepare this by precipitating the mineral compound under conditions such that the enlargement or swelling of the grains of the precipitate formed is limited to a value below 10 μm. Preferably the average grain size of the particles is equal to or below 1 μm. In this case, there is a close control of the precipitation parameters, in order to assist the multiplication of the nuclei by limiting there enlargement over a period of time, so as to obtain ultrafine, regular particles.

This can be obtained by maintaining the reaction medium at a sufficiently low temperature and in the presence of a thickener, so as to slow down and control the formation of precipitate nuclei. It is also possible to perform the precipitation reaction under conditions such that the contact surface between the reagents is as large as possible as soon as they are contacted in the reactor.

To this end, it is possible to use precipitation reagents in a maximum division state, e.g. by bringing them into the form of an aerosol or foam before introducing them into the precipitation reactor. Such conditions assist a perfect homogeneity of the precipitate, because the diffusion movements inherent in any mixing operation of two miscible liquids are consequently eliminated and this also applies with regards to local concentration variations occurring during non-instantaneous homogenization of the reaction medium.

It is also possible to carry out the precipitation reaction in a microreactor having a minimum volume in order to operate under substantially constant time and concentration conditions. In this case, there is a continuous introduction of each of the reagents with an introduction flow rate fixed as a function of the precipitation speed and the reaction products are continuously discharged. Thus, reaction takes place at a constant concentration and the reaction products are eliminated as they are formed.

In order to carry out the precipitation reaction, it is preferable to operate in a homogeneous phase in order to obtain a good grain size distribution regularity. This can be obtained by using reagents dissolved in a common solvent which can e.g. be ethanol in the case of the hydrolysis of one or more alkoxides for forming single or mixed oxides or hydroxides.

According to the inventive process, the suspension of non-colloidal particles is prepared by applying energy to the reaction medium during the precipitation reaction. This energy can be mechanical energy, e.g. ultrasonic energy, or electrical energy, e.g. an alternating electrical field of appropriately chosen frequency and voltage, or can consist of an iradiation. This energy makes it possible to prevent the agglomeration of precipitated particles and in this way to obtain finely divided particles. This energy application can be associated with the use of a continuous microreactor for controlling the precipitation reactions in the manner described hereinbefore.

In the case where a suspension of colloidal particles is formed by precipitating the mineral compound, which may or may not be followed by a peptization treatment, it is also possible to apply energy to the reaction medium during precipitation and/or peptization reactions in order to obtain ultrafine particles and maintain them in the desired division state. Following the preparation of the suspension of colloidal or non-colloidal particles, a thin layer of the mineral compound is formed on the porous, permeable substrate preferably by using the engobing or slip painting procedure.

It is pointed out that the engobing process applied to the deposition of a suspension of solid particles in a liquid consists of contacting the inner and/or outer wall of the porous substrate with the suspension able to form the layer which it is wished to deposit on the porous substrate. More specifically, said contacting takes place by linking the substrate with a tank containing the suspension of colloidal or non-colloidal particles. The tank is provided with a deformable membrane making it possible, under the influence of the presence of a fluid, to produce volume variations within the tank, which leads to the rise or fall of the suspension of particles along the porous substrate.

In order to obtain a homogeneous layer adhering to the porous substrate, it is possible to adjust the rheological and surface properties of the suspension by means of one or more pyrolyzable additives during the annealing treatment and these are chosen from among the surfactants, visco-active agents and organic binders.

The use of surfactants makes it possible to improve the adhesion of the layer to the substrate. The surfactant can e.g. by polyvinyl alcohol. Visco-active agents make it possible to obtain a suspension of adapted viscosity, which has an effect on the compactness of the deposit an essential factor for obtaining a good cohesion. The visco-active agents can be derivatives of cellulose, such as carboxymethyl cellulose.

In general, it is desirable for the suspension to have a viscosity of 10 to 50 centipoises and this can also be adjusted by modifying the concentration of particles in the suspension. Thus, it is preferable to limit to the greatest extent possible the proportion of additives because the latter must then be eliminated during the annealing treatment. The presence of an organic binder in the suspension has the effect of facilitating the deposition of particles and there cohesion to the substrate. However, it is necessary for the binder not to disturb the organization of the layer during its elimination by heating. Moreover, it is sometimes advantageous to use a binder pyrolyzable at moderate temperature, e.g., a nitrocellulose solution in an appropriate solvent. However, it is possible to use binders pyrolyzoable at a higher temperature, e.g. polyvinyl alcohol.

It is also possible to improve the properties of the suspension by appropriately choosing the liquid thereof, which can be constituted by an aqueous solution, an organic solution or mixtures thereof. When use is made of a hydroalcoholic solution, the homogeneous incorporation of the binder into the suspension can be obtained by dissolving a cellulose collodion in an alcohol, by then eliminating by ultrafiltration most of the water in the hydroalocoholic suspension and by finally adding the collodion.

In order to minimise cracking phenomenon which can occur during drying and subsequent annealing of the layer, it is advantageous to deposit a layer of very limited thickness, e.g. a thickness at the most equal to 1

μm, because this greatly reduces the preponderance of shrinkage stresses and strains within the layer compared with adhesion forces of the substrate particles. Moreover, the use of such limited thicknesses makes it possible to obtain very permeable membranes, which are of particular interest for certain industrial applications.

It is possible to achieve such a small thickness by appropriately matching the open porous volume of the substrate to the rheological and surface properties of the suspension, the volume of the deposit varying directly with the open porosity of the substrate.

It is also desirable in certain cases to subject the substrate to a pretreatment making it possible to improve the adhesion between the microporous layer and the substrate by e.g. aiding the development of chemical bonds between the layer and the substrate during annealing.

According to a first embodiment, said pretreatment consists of chemical etching of the surface grains of the porous, permeable substrate, e.g. by means of an alkaline lye under concentration, temperature and time conditions making it possible to limit the surface etching to the desired value for facilitating the subsequent attachment of the thin mineral compound layer.

According to a second embodiment, said pretreatment consists of fixing in the surface porosity of the substrate a compound liable to form with the constituent or constituents of the layer, a solid solution or a mixed oxide. In the case of a thin zirconium oxide layer, such a compund can be the stabilizing constituent or constituents of said oxide, e.g. yttrium oxide, a lanthanide oxide, calcium oxide or magnesium oxide.

The deposition in the surface porosity of the substrate of the stabilizing compound makes it possible to ensure a good cohesion between the macroporous substrate and the microporous layer. To this end, it is also possible to deposit on the substrate surface a finish which is reactive with respect to the layer, a subsequent heat treatment making it possible to then produce the bonds necessary for the adhesion of the active layer to the substrate. This can be obtained by impregnating e.g. the surface zone of the porous substrate with a pyrolyzable yttrium salt and by then thermally treating the thus impregnated substrate to convert the yttrium salt into an yttrium oxide, which could then react with the layer deposited during the annealing treatment.

According to a variant, it is also possible to fix in the surface porosity of the substrate, a compound constituted by one of the reagents used for the formation of the mineral compound constituting the layer.

In this case, the suspension used for the deposit contains at least one precursor of said mineral compound, so as to form the mineral compound layer by in situ reaction of said reagent and said precursor. The reaction can be performed during the annealing heat treatment at a moderate temperature.

For example, it is possible to obtain in this way a zirconium hydroxide layer stabilized by yttrium or magnesium, by firstly impregnating the porous substrate with a hydrated yttrium or magnesium salt and by then depositing zirconium alkoxide, optionally associated with yttrium or magnesium alkoxide on the thus prepared substrate.

By heating at a temperature at least equal to the decomposition temperature of the alkoxide, the zirconium oxide is formed, but a complementary heat treatment is necessary for stabilizing the zirconium oxide layer by yttrium or magnesium oxide and this can be carried out once and for all during annealing.

Following the deposition of the layer on the porous substrate, the latter undergoes drying and then an annealing heat treatment. Drying can be carried out at ambient temperature, in order to prevent cracking. Thus, as the evaporation kinetics of the interstitial liquid differ on the surface of the deposit and in the inner layers, cracks frequently appear as a result of shrinkage difference during drying. It is also a good idea to greatly slow down the evaporation speed of the solvent in order to obtain a homogeneous drying, which excludes any temperature rise during this phase.

The annealing treatment is performed at a temperature of 400° to 1100° C. and its temperature and duration chosen as a function of the nature of the deposited layer and the pore radii which it is wished to obtain.

The porous, permeable substrates used according to the invention must have on the surface for receiving the thin layer, a porous texture with a pore radius below 2 μm, with irregularities of the surface state less than a few um, so as to avoid a significant penetration of the layer into the pores of the substrate and the formation of cracks or macroporous faults. These must also have a good mechanical behavior, a high permeability and a satisfactory surface state. They can be constituted by a coarse support having pores with a large radius (e.g. 4 to 20 μm), which is covered with a thin layer of a few dozen μm with a much finer texture (0.05 to 2 μm). They can be made from metal, e.g. nickel, or a ceramic material, e.g. alumina.

Other features and advantages of the invention can be gathered from the following non-limitative description.

EXAMPLE 1

A permeable, mineral membrane is produced having a microporous zirconium oxide layer on a porous, permeable alumina substrate with a two-layer structure, namely a thick, mechanically strong macroporous layer with an average pore radius of 5 to 10 μm, covered with a thin layer having a mean pore radius of 0.2 μm.

Firstly, a suspension of zirconium hydroxide colloidal particles is prepared by hydrolyzing an alcoholic solution of zirconium propylate by a hydroalcoholic mixture which is slowly introduced, whilst subjecting the reaction medium without interruption to the action of an ultrasonic generator with a frequency of 20 kilocycles.

After precipitation, peptization of the hydroxide suspension takes place by also subjecting the reaction medium to the action ultrasonics for four hours. For this peptization use is made of perchloric acid in a quantity such that it corresponds to 0.07 mol of perchloric acid per mol of zirconium propylate.

This gives a colloidal suspension of zirconium hydroxide with a zirconium concentration of approximately 20 to 30 g/l and a grain size of 1000 Å. This zirconium concentration is approximately 80% higher than that reached with mechanical stirring alone.

To the suspension is then added a visco-active agent constituted by polyvinyl alcohol, so as to obtain a viscosity of 25 cP and the zirconium hydroxide is deposited on the surface of the porous substrate by using the engobing method. The assembly is then dried for four hours at ambient temperature in air with a humidity level of 60%, followed by annealing at 600° C. for two hours.

This leads to a membrane having a microporous zirconium oxide layer with a thickness of 3 μm, a mean pore size of 80 Å and a nitrogen permeability of $1600.10^{-7}$ mole/cm$^2$.min.cm of Hg.

EXAMPLE 2

This example illustrates the preparation of a permeable mineral membrane having a microporous zirconium oxide layer stabilized by yttrium oxide.

As in example 1, a suspension of colloidal particles of zirconium hydroxide is prepared and to it is added an yttrium salt quantity corresponding to 8 molar % of $Y_2O_3$, which will then serve as a zirconia-stabilizing oxide.

This addition makes it possible to eliminate the effects of transforming the monoclinic zirconia type into the quadratic type, particularly with regards to the shrinkage resulting from the corresponding volume variation.

As in example 1, this is followed by the deposition of a layer of colloidal zirconium hydroxide particles containing yttrium on a substrate identical to that of example 1, followed by drying and annealing under the same conditions as in example 1.

This leads to a membrane with an active layer of structure $ZrO_2$, stabilized by $Y_2O_3$ and having a thickness of 3 μm, a mean pore radius of 70 Å and a nitrogen permeability of $1500.10^{-7}$ mole/cm$^2$.min.cm of Hg.

EXAMPLE 3

In this example, a permeable, mineral membrane is prepared, which has a microporous zirconium oxide layer stabilized by calcium or magnesium oxide. The same operating procedure as in example 2 is used, whilst replacing the yttrium salt by a calcium or magnesium salt and results identical to those of example 2 are obtained.

EXAMPLE 4

This example relates to the production of a permeable, mineral membrane having a microporous titanium oxide layer deposited on a permeable, porous, tubular, alumina substrate, like that of example 1.

Firstly a suspension of colloidal titanium hydroxide particles is prepared by hydrolizing an alcoholic solution of titanium butylate by a water excess, whilst subjecting the reaction medium to the action of an ultrasonic generator with a frequency of 35 kilocycles for one hour. This is followed by the peptization of the thus obtained titanium hydroxide suspension at ambient temperature by means of hydrochloric acid using a hydrocholoric acid quantity such that it corresponds to 0.07 mol of hydrochloric acid per mol of titanium butylate. Peptization is carried out for two hours by also subjecting the reaction medium to the action of the ultrasonic generator. In this way a suspension of colloidal titanium hydroxide particles is obtained, which has a grain size of approximately 300 Å. The suspension is then concentrated under ultrasonics at 60° C. to obtain a particle concentration of 30 g/l.

The viscosity of the suspension is then adjusted to 25 cP and the colloidal titanium hydroxide particles are deposited on the inner surface of the tubular substrate by engobing. Following slow drying at ambient temperature, the assembly undergoes annealing at 600° C. for one hour. The means pore radius of the microporous titanium oxide layer is approximately 40 Å. Its thickness is 4 μm and its nitrogen permeability $1000.10^{-7}$ mole/cm$^2$.min.cm Hg.

If the annealing temperature is 800° C. instead of 600° C., the mean pore radius after annealing rises to 80 Å.

EXAMPLE 5

This example relates to the production of a membrane having a microporous titanium oxide layer prepared under the same conditions as that of example 4, except that homogeneous phase hydrolysis is performed by means of a hydroalcoholic mixture instead of using water. The membrane obtained has pore radius and permeability characteristics identical to those of the membrane of example 4. However, the pore distribution spectrum around the mean value is more homogeneous than in the case of the membrane of example 4. Thus, through carrying out precipitation in the homogeneous phase a more regular texture is obtained.

EXAMPLE 6

This example illustrates the preparation of a porous membrane having a microporous zirconium oxide layer obtained from an aqueous suspension of colloidal zirconium hydroxide particles.

The suspension of colloidal zirconium hydroxide particles is prepared by using the Miller method. To this end, there is a slow addition of ammonia to an aqueous zirconium nitrate solution, the precipitate obtained is washed with water and it is redissolved in a zirconium nitrate solution, so that a colloidal solution is obtained. By hot evaporation, the viscosity of the suspension is then regulated to bring it to a value of 30 cP. This is followed by the deposition of colloidal particles on a porous alumina substrate identical to that of example 1 by engobing, followed by drying the layer and its annealing at a temperature of 600° C. for one hour. This leads to a microporous zirconium oxide layer with a mean pore radius of 40 Å and a nitrogen permeability of $1500.10^{-7}$ mol/cm$^2$.min.cm Hg.

EXAMPLE 7

This example illustrates the preparation of a porous membrane having a microporous titanium oxide layer obtained from a suspension of non-colloidal particles.

Precipitation is carried out in this case in a reactor with a volume of approximately 40 cm$^3$ within which is circulated a solution of titanium butylate in ethanol and a hydroalcoholic mixture at constant flow rates of approximately 10 cm$^3$/min. The titanium butylate concentration of the alcholic solution and the water quantity in the hydroalcholic mixture are such that the water is in excess compared with the titanium butylate. The reaction medium is simultaneously subjected to the action of an ultrasonic generator at a frequency of 30 kilocycles and there is a continuous extraction of the products formed in the reactor. Thus, at the reactor outlet, a suspension of titanium hydroxide particles is obtained, which is then concentrated to obtain a concentration of 30 g/l. The hydroxide particles are deposited on a porous, permeable alumina substrate identical to that of example 1 by engobing. The layer is then dried under the same conditions as in examples 4 and 5 and annealing takes place at 600° C. for one hour. This leads to a titanium oxide solution with a mean pore radius of 150 Å and a nitrogen permeability of $3500.10^{-7}$ mole/cm$^2$.min.cm Hg.

EXAMPLE 8

This example illustrates the preparation of a porous membrane having a microporous titanium oxide layer deposited on a porous, permeable alumina substrate identical to that of example 1.

Firstly a suspension of colloidal titanium hydroxide particles is prepared by hydrolizing titanium butylate in dilute solution in a hydroalcoholic mixture, in the presence of hydrochloric acid with a pH of 1.5. This makes it possible to avoid the use of ultrasonics, but particles with small dimensions are not obtained. This leads to a colloidal titanium hydroxide suspension with a mean grain size of approximately 600 Å.

If the reaction medium is subject to the action of an ultrasonic generator with a frequency of 35 kilocycles, as in example 4, a suspension is obtained, whose colloidal particles have a mean grain size of 300 Å.

A visco-active agent constituted by polyvinyl alcohol is then added to the suspension, so as to obtain a viscosity of 25 cP and titanium hydroxide is deposited on the porous substrate surface by engobing. This is followed by drying the assembly for four hours at ambient temperature is air with a humidity of 60%, followed by annealing at 600° C. for one hour.

This leads to a membrane with a microporous titanium oxide layer with a mean pore radius of approximately 40 Å and a nitrogen permeability of $1200.10^{-7}$ mol/cm$^2$.min. cm.Hg.

EXAMPLE 9

This example illustrates the production of a permeable, mineral membrane having a microporous zirconium oxide layer deposited on a porous substrate identical to that of example 1.

Essentially the same operating procedure in as in example 1 is followed, but instead of subjecting the reaction medium to the action of an ultrasonic generator, electrical energy is supplied in order to prepare the suspension of colloidal zirconium hydroxide particles One starts with an alcoholic zirconium butylate solution, which is hydrolized by water introduced slowly and continuously into the zirconium butylate solution, which is then subject to the action of an electric field under a high voltage of approximately 8 to 10 kV.

This leads to a suspension of colloidal zirconium hydroxide particles, whose average size is approximately 800 Å. The concentration of colloidal particles in the suspension is approximately 25% higher than that reached by simple mechanical stirring This is followed by the deposition of zirconium hydroxide on the surface of the porous substrate. The assembly is dried and annealed using the same operating procedure as in example 1.

This leads to a membrane with a microporous zirconium oxide layer having characteristics identical to those obtained in example 1.

EXAMPLE 10

This example illustrates the preparation of a permeable, mineral membrane having a microporous zirconium oxide layer on a porous, permeable substrate of alumina identical to that of example 1.

In this example, a suspension of colloidal zirconium hydroxide particles is prepared using the same operating procedure as in example 9, but by adding a peptizing agent during the zirconium butylate hydrolysis reaction. To this end, hydrochloric acid with a pH of 1 is added at the end of the hydrolysis operation.

This leads to a suspension of colloidal zirconium hydroxide particles with characteristics identical to these obtained in example 9, but the suspension has a better stability, because there is no zirconium hydroxide precipitation. However, in the case of the suspension contained in example 9, it is necessary to use said suspension very rapidly because if not there would be a precipitation of the zirconium hydroxide during storage.

This suspension is used under the same conditions as in example 9 for forming a membrane having a microporous zirconium oxide layer and the characteristics of the layer obtained are identical to those obtained in example 1.

EXAMPLE 11

This example illustrates the preparation of a porous, permeable, mineral membrane having a microporous zirconium oxide layer deposited on a porous, alumina substrate identical to that of example 1, but which has undergone a pretreatment consisting of chemical etching. In order to carry out this pretreatment, the tubular alumina substrate is immersed for one hour at 50° C. in a NaOH solution with a pH of 14, followed by washing and drying.

A peptized colloidal zirconium hydroxide suspension is prepared and the viscosity of the suspension is adjusted to 30 cP by concentration and addition of a polyvinyl binder. The thus obtained peptized gel is then deposited by engobing on the inner surface of the tubular alumina substrate, which has been pretreated to improve the adhesion of the zirconium oxide layer on the substrate.

The coated substrate then undergoes annealing at 600° C. for one hour, giving a microporous layer with a mean pore radius below 75 Å and a nitrogen permeability of $1400.10^{-7}$ mol/cm$^2$.min.cm of Hg.

What is claimed is:

1. A process for the production of a porous, permeable mineral membrane, which comprises:
   (a) precipitating from a solution of metal alkoxide or metal salt, at least one mineral compound selected from the group consisting of (i) a simple or mixed metal oxide, not including aluminum oxide and mixed aluminum oxides, (ii) a simple or mixed metal hydroxide, not including aluminium hydroxide and mixed aluminum hydroxides, and (iii) mixtures thereof, thereby forming a liquid suspension of colloidal or non-colloidal particles of said mineral compound or a precursor thereof having particle sizes below 10 μm, siad suspension of colloidal or noncolloidal particles being kept in the finely divided state by the continuous application of energy to the reaction medium;
   (b) forming from said suspension a microporous thin layer of said at least one mineral compound on a porous, permeable substrate, which has a porous texture characterized by pores of radii less than 2 μm;
   (c) drying said formed layer; and
   (d) annealing said layer at a temperature between 400° and 1100° C., thereby preparing said porous, permeable mineral membrane.

2. The process according to claim 1, wherein the suspension further comprises a filler, in order to form on the substrate a thin layer of said mineral compound in which a filler is dispersed.

3. The process according to either of the claims 1 or 2, wherein the simple or mixed metal hydroxides and oxides are simple or mixed hydroxides and oxides of metals selected from the group consisting of titanium, zirconium, silicon, magnesium, calcium, cobalt, manganese and nickel.

4. The process according to either of the claims 1 or 2, wherein the suspension comprises a first mineral compound selected from the group consisting of titanium oxide, zirconium oxide and silicon oxide and at least one second mineral compound selected from the group of consisting of yttrium oxide, oxides of lanthanides, vanadium oxide, calcium oxide and magnesium oxide.

5. The process according to claim 1, wherein the suspension of colloidal particles is prepared by precipitating said mineral compound followed by a peptization treatment of the precipitate to convert it into colloidal particles.

6. The process according to claim 1, wherein a suspension of colloidal particles is prepared by precipitating the said mineral compound and applying energy to the reaction medium.

7. The process according to claim 1, wherein a suspension of non-colloidal particles is prepared by precipitating said mineral compound under conditions such that the enlargement of the particles of the precipitate formed is limited to a value below 10 $\mu$m.

8. The process according to claim 7, wherein precipitation takes place in the homogeneous phase.

9. The process according to claim 7, wherein precipitation takes place on the basis of reagents in the form of aerosols or foams.

10. The process according to claim 1, wherein the suspension liquid is an aqueous solution, an organic solution or mixtures thereof.

11. The process according to claim 1, wherein the suspension contains at least one additive pyrolyzable during the annealing treatment and selected from the group consisting of surfactants, visco-active agents and organic binders.

12. The process according to claim 1, wherein the energy is ultrasonic energy.

13. The process according to claim 1, wherein the mineral compound layer is deposited on the substrate by engobing.

14. The process according to claim 1, wherein the layer of the mineral compound has a thickness of at the most 1 $\mu$m.

15. The process according to claim 1, further comprising pretreating the porous, permeable substrate to improve the adhesion of the layer to the substrate.

16. The process according to claim 15, wherein the pretreating consists of fixing in the porosity of the substrate a compound able to form with the constituent or constituents of the layer a solid solution or a mixed oxide.

17. The process according to claim 16, wherein the compound is one of the reagents used for the formation of the mineral compound constituting the layer.

18. The process according to claim 17, wherein the suspension contains at least one precursor of said mineral compound, so as to form the mineral compound layer by in situ reaction of said reagent and said precursor.

19. The process according to claim 15, wherein the pretreating consists of carrying out chemical etching of the surface of the porous, permeable substrate.

* * * * *